(12) United States Patent  
Caraglio et al.

(10) Patent No.: US 9,660,454 B2
(45) Date of Patent: May 23, 2017

(54) APPARATUS AND METHOD FOR MANAGING AND CONDITIONING PHOTOVOLTAIC POWER HARVESTING SYSTEMS

(76) Inventors: Alessandro Caraglio, Pontedera (IT); Paolo Carletti, Montecchio Emilia (IT)

( * ) Notice: Subject to any disclaimer, the term of this patent is extended or adjusted under 35 U.S.C. 154(b) by 296 days.

(21) Appl. No.: 13/321,885

(22) PCT Filed: May 25, 2010

(86) PCT No.: PCT/IB2010/052317
§ 371 (c)(1),
(2), (4) Date: Nov. 22, 2011

(87) PCT Pub. No.: WO2010/136968
PCT Pub. Date: Dec. 2, 2010

(65) Prior Publication Data
US 2012/0068543 A1    Mar. 22, 2012

(30) Foreign Application Priority Data

May 27, 2009    (WO) .............................. PI2009A0067

(51) Int. Cl.
*H02J 3/38*    (2006.01)
(52) U.S. Cl.
CPC .............. *H02J 3/383* (2013.01); *Y02E 10/563* (2013.01); *Y10T 307/653* (2015.04)

(58) Field of Classification Search
USPC .................. 307/5, 43, 58, 63, 71, 75, 80, 82
See application file for complete search history.

(56) References Cited

U.S. PATENT DOCUMENTS

2003/0218888 A1    11/2003   Suzui et al.
2004/0159102 A1*    8/2004   Toyomura ............... H02J 3/383
                                                            60/641.8

FOREIGN PATENT DOCUMENTS

| EP | 1429394 | 6/2004 | |
|---|---|---|---|
| WO | 03098703 | 11/2003 | |
| WO | 2008125915 | 10/2008 | |
| WO | WO 2008125915 | * 10/2008 | |
| WO | WO 2008125915 A2 * | 10/2008 | ................ H02J 3/38 |

\* cited by examiner

Primary Examiner — Rexford Barnie
Assistant Examiner — Xuan Ly
(74) Attorney, Agent, or Firm — Preston Smirman; Smirman IP Law, PLLC

(57) ABSTRACT

The efficiency of a PV power generation system (10) is maximized by an apparatus providing series of electronic units (20) connected to the PV modules (12) and comprising microprocessor controlled DC converters/power supply units. A managing unit (60) communicates with the electronic units (20) of a string (11) in order to carry out a synergic optimization of the efficiency both of the single PV modules (12) and of the entire string (11). The apparatus also provides PV module (12) by PV module (12) diagnostic features and it is able to communicate with external devices for a full system control.

7 Claims, 5 Drawing Sheets

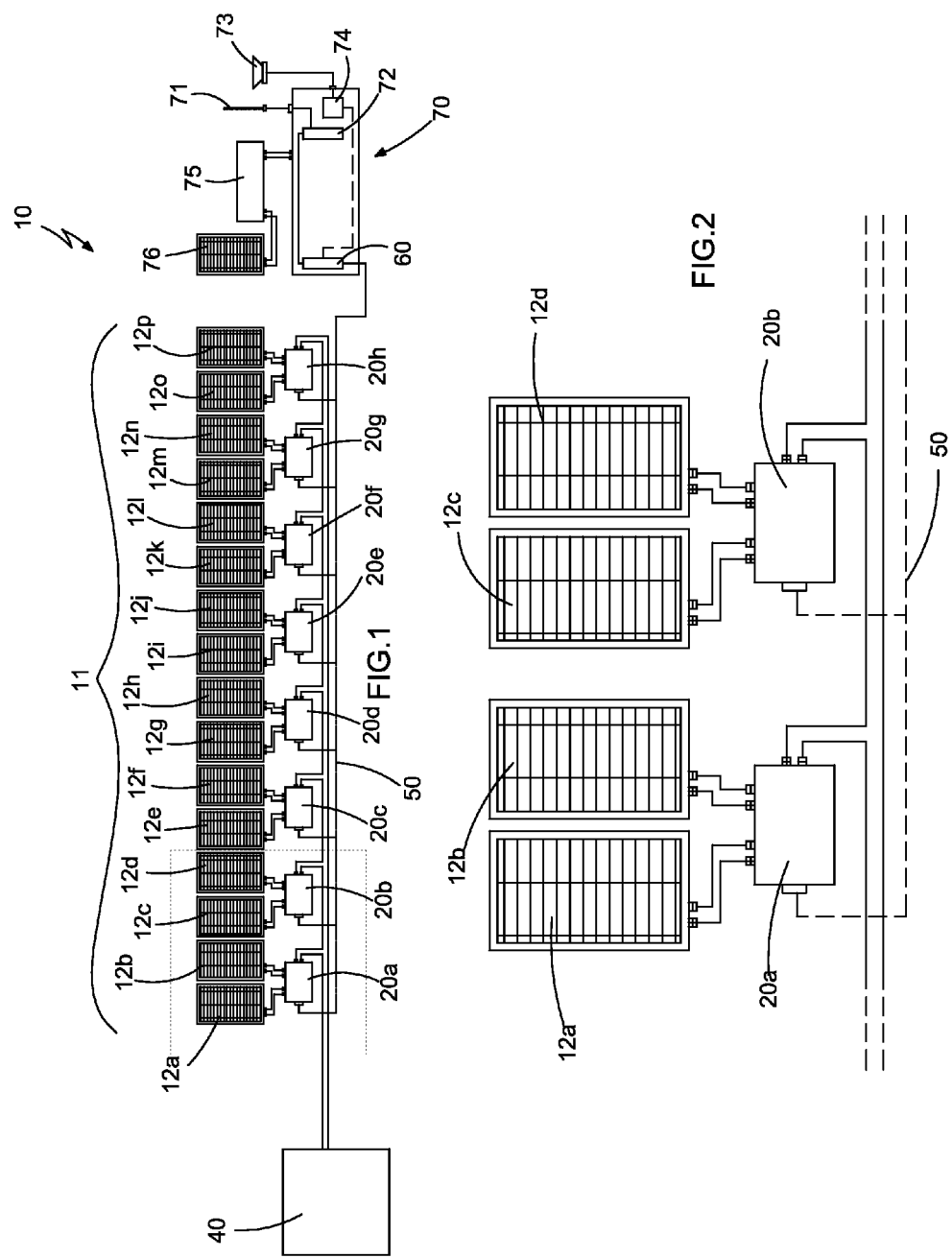

APPARATUS AND METHOD FOR MANAGING AND CONDITIONING PHOTOVOLTAIC POWER HARVESTING SYSTEMS

CROSS-REFERENCE TO RELATED APPLICATION

The instant application is a national phase of International patent application number PCT/IB2010/052317, filed May 25, 2010, which claims priority to IT PI2009A000067, filed May 27, 2009, the entire specifications of both of which are expressly incorporated herein by reference.

FIELD OF THE INVENTION

The present invention relates to a method for conditioning the electric power generated by strings of DC power generators connected in series in order to maximise the efficiency of said strings of power generators.

In particular, a preferred embodiment of the invention relates to a method for conditioning electric power generated by photovoltaic modules (PV modules) in order to maximise the efficiency of the photovoltaic power generation system comprising said photovoltaic modules.

The invention also relates to an electronic apparatus to be installed between PV modules and inverters in photovoltaic power generation systems, for managing and conditioning said photovoltaic power generation systems.

DESCRIPTION OF THE PRIOR ART

In common photovoltaic power generation systems a defined number of PV modules are wired in series in a string. A large number of identical strings are then connected in parallel to a direct current (DC) power bus that connects to a central inverter, usually a grid-tie inverter which links the photovoltaic power generation system to the alternating current mains.

Electrically, a photovoltaic system can be seen as a parallel of voltage generators, with their internal series resistance and a cumulative bypass diode in series (corresponding to a string of PV modules wired in series), the voltage of the DC bus (VDCbus) being the main DC supply of the inverter.

Every current contribute of strings is a part of the total current such that the power amount at the inverter input is total current multiplied VDCbus.

The current share, of course, can be obtained only if the string voltage is equal to VDCbus minus the diode voltage drop. If the string voltage is smaller, the diode is reversely biased and stops conduction, so the string in this condition is hardly disconnected and the power amount at the inverter input drops down. A single module in trouble compromises an entire string.

It is obvious that the current is decided by the bottle neck of the string, and the voltages are consequences.

The entire system comprises photovoltaic modules, connectors, DC wiring, bypass diodes, string fuses, string converters and central inverters and it results in a complex electrical system that only develops maximum power when it is perfectly balanced, that is when all photovoltaic modules are evenly irradiated and electrically balanced and all the other components are homogeneous and balanced.

Unfortunately, dirtiness, rain, clouds, shadows, modules' characteristics tolerances, cable differences in length, cells' misalignments, heat, wind, humidity and many other factors severely affects the efficiency of the photovoltaic system.

In order to improve the global efficiency of photovoltaic power generation system the first solution developed was the introduction of high efficiency DC to DC converters, usually called string converters because they are placed one per string, and able to perform MPPT (Maximum Power Point Tracking). By means of an MPPT string converter it is possible to control the voltage before entering the main DC bus and simplify the current sharing.

Here, though string voltages do not perfectly match, the MPPT string converter can compensate by asking PV modules for a higher or lower current and stabilizing the voltage at the VDCbus value.

Nevertheless the optimizing action of the string converter is limited to the string voltage as a whole, and it is not able to know which is/are the PV module/s that, due to shading, dirtiness or other factors, are compromising the string voltage.

In addiction, the string converters input range is about 5-10V around the output nominal voltage value so that demanding for a greater boost will only lead to hard disconnection of the entire string.

To improve the efficiency of single PV modules is known an electronic device to be placed at the output of each PV module. Strings become series of such electronic devices which are either connected directly through the VDCbus to the central inverter or they are connected to string converters.

The electronic device acts as a current limiter/step-up (always boosting) power supply. By measuring voltage and current from the PV module and comparing them to I-V and/or P-V characteristic curves of the PV module, it can determine if a module is not in a full-power behaviour and, in case, it stops boosting. It increases the voltage at the output but limits the current and the PV module roughly remains around its maximum power point.

Especially when they are combined with MPPT string converters such electronic devices improve the efficiency of the PV system but they do not solve the string hard disconnection because there is no feedback by the entire string voltage. In addiction, such electronic devices perform an always boosting power conditioning that do not allow the MPPT string converter (or the MPPT of the entire system) to reach a working point that is a real and global maximum.

The above can be obtained, for instance, through WO 2008/195215 which discloses a method and apparatus for efficiently monitoring the operation of a harvesting system using DC power sources. WO 2008/195215 provides a plurality of monitoring modules each associated to a power source and collecting performances of the associated power sources, a plurality of transmitters for transmitting data collected by the monitoring modules to controller modules and a central analysis station for receiving performance data from the monitoring modules, said central analysis station being able to analyze fault detection. An electronic device described in WO 2008/195215 which is associated to a DC power source is a DC to DC converter which comprises a power conversion controller which is coupled to a microcontroller including an MPPT module and a communication module. It also comprises current and voltage sensor for measuring current and voltage values at the output of the DC power source provided for allowing the power conversion controller to maintain the converter input power at the maximum power point. The buck and boost portions of the converter are controlled according to the measured converter output and to an MPPT algorithm implemented in the controller.

The microcontroller of the electronic unit may also receive data from external sensors such as ambient temperature sensors, solar radiance sensors or sensors from neighbouring panels (specific DC power source). Data from the above sensors, as well as current and voltage data are used only to perform analysis of the state of the DC power source by the central analysis station, that is to detect failures or inefficiency of the panels. The central analysis station is not able to affect the power conversion of each electronic unit as one-way communication is used and when a bidirectional communication is used it is just to let the central analysis station request the data collected by the electronic units. The power conversion operated in each electronic unit is managed by its power conversion controller and microcontroller which operate taking into account voltage and current at the output of the associated DC power source and voltage and current at the output of its power converter. The result is an internal optimization of the power production that cannot take into account the power produced in the other electronic units of the string or system. It is also known a further electronic device to be connected exactly like any other PV module at the end of the string. It is able to create virtual voltages and currents starting from the DC bus and flowing towards the device, by using a high-voltage input step down topology. This way the main DC bus becomes the power source and the feedback of the system so allowing effectively balancing the string. The above electronic device is also able to provide diagnostic features and to predict the need for a cleaning, ground faults or the like, but only at string level. There is no precise information on single PV modules. Another limit of the device is that the string current is still limited by the bottle neck PV module, so the optimization too is limited in the string balancing minus conversion power losses (as higher as the DC bus voltage increases because the buck coefficient becomes really big and the components in the power stage of the device have to fulfil to very large and time-short current pulses).

As it is clear from the above it is not satisfied the need of maximising the efficiency of a PV system since no devices of the known art are able to perform an optimization of the efficiency of single PV modules combined in order to obtain at the same time the optimal balancing of the modules, of each string and of the entire array.

In addiction, no device of the known art is able to guarantee diagnostic features at PV module level so that troublesome modules cannot be exactly identified and consequently maintained or repaired

SUMMARY OF THE INVENTION

It is object of the present invention to propose a method for conditioning power produced by series of DC power generators such as PV modules, batteries connected in series in UPS systems, fuel cells, in the automotive sector, or the like.

In particular, it is main object of the present invention to propose a method for conditioning power produced by PV generators in PV power generation systems in order to maximise the efficiency of such systems.

Further object of the present invention is to propose an electronic apparatus to be installed in PV power generation system able to overcome the above disclosed limits of the known art.

In particular, it is object of the present invention to propose an electronic apparatus apt to maximise the efficiency of PV power generation system by balancing the system at PV module, string and array level in a synergic way.

Another object of the present invention is to propose an electronic apparatus apt to perform diagnostic procedures at PV module level.

Another object of the present invention is to propose an electronic apparatus apt to gather, elaborate and transmit detailed information about the working conditions of the components of a PV power generation system.

The above mentioned objects are achieved by a method for managing and conditioning power generation systems in which DC power generators are wired in series to form at least one string of power generators and in which, in case the system comprises several strings, the strings are connected in parallel to DC power bus connected to at least one inverter apt convert DC current to suitable AC current wherein the voltage and/or current at the output of at least two of said DC power generators are subjected to their own phases of:

measuring;
processing the measured values;
DC to DC conversion/power supply;

and wherein said DC to DC conversion/power supply takes place according to the results of said processing phase, each of said processing phases being performed as a function of: the voltage and/or current values measured at the output of the respective DC power generator; the voltage and/or current values measured at the output of the respective DC to DC conversion/power supply phase; the voltage and/or current values measured at the output of at least another DC power generator; and the voltage and/or current values measured at the output of the DC to DC conversion/power supply phase associated to said another DC power generator.

Thanks to the above method the DC current at the output of a DC power source is subjected to a DC to DC conversion which takes into account not only the parameters of the DC current produced in that and other DC power sources but also the results of the DC to DC conversion operated at the output of other DC power sources of the system. For instance, in case there are two DC power sources, the DC current at the output of each power source is subjected to a DC to DC conversion process which takes into account also the results of the other DC to DC conversion process. In this way the DC to DC conversion processes are able to affect each other in order to maximise the efficiency of the system.

In a preferred embodiment of the invention said power generation systems are photovoltaic systems and said DC power generators are PV modules.

Advantageously said processing phase is performed according to an algorithm apt to optimize the voltage and DC current values at the input of the inverter. Preferably, such algorithm applies a mathematical or computational model based on neural networks, in particular an adaptive multilayer perceptron neural network.

Each DC to DC conversion process is a node of a neural network and all the nodes cooperate for maximising the power produced in the entire network, whereas in conventional systems each DC to DC conversion is performed for optimising the efficiency of the only DC power generator to which it is associated.

Still advantageously the voltage and/or current at the output of every PV module of the PV power generation system are subjected to the above phases, so that the efficiency of every module is independently measured, and they are separately conditioned in way that is able to take on account the behaviour of all the other PV modules so that it is possible to obtain from them a synergic work leading to the optimization of the efficiency of the entire string/and or array. As a further result hard disconnection of one or more troublesome modules can be avoided in most cases, and they are still able to contribute to the power generation.

The above objects are also achieved by an apparatus for managing and conditioning PV power generation systems in which PV modules are wired in series to form at least one string of modules and in which, in case the system comprises several strings, the strings are connected in parallel to DC power bus connected to at least one inverter apt convert DC current to suitable AC current, said apparatus comprising DC to DC converters/power supply units acting upon the voltage and/or current at the output of said PV modules, measuring means for measuring the voltage and/or current at the output of said PV modules, further measuring means for measuring the voltage and/or current at the output of said DC to DC converters/power supply units, driving means for operating said DC to DC converters/power supply units, and at least one microprocessor apt to control said driving means of a single DC to DC converters/power supply unit depending on the voltage and/or current at the output of at least two of said PV modules and the voltage and/or current at the output of at least two of said DC to DC converters/power supply units.

The microprocessor, which can be a single central microprocessor or a plurality of microprocessors, operates taking into account not only the parameters of the DC current at the output of each PV module but also the results of the DC to DC conversion processes carried out at the output of other PV modules. In this way the DC current produced by each PV module is conditioned not only in order to take it at its maximum power point but rather to keep the entire system in condition of producing the maximum amount of power.

Advantageously one string of PV modules of said PV power generation system comprises at least two electronic units; each of said electronic units is connected to at least one PV module of the string; said at least two electronic units are wired in series; each of said electronic units comprises said measuring means for measuring the voltage and/or current at the output of each PV module connected to it, at least one power stage of said DC to DC converters/power supply unit for each PV module connected to it, a DC power bus or the like for connecting in parallel the output of each of said power stages when more than one power stages are comprised, said further measuring means for measuring the voltage and/or current at the output of said DC to DC converters/power supply unit, driving means for operating each of said power stages, said at least one microprocessor apt to control said driving means; said at least one microprocessor comprising communication means for communicating with at least one more microprocessor comprised in at least another of said electronic units.

The microprocessors control the power stages thereof according to an algorithm apt to optimize the voltage and DC current values at the input of the inverter. Preferably, such algorithm applies a mathematical or computational model based on neural networks, in particular an adaptive multilayer perceptron neural network, in which the nodes of said neural network are placed in said microprocessors.

Each node of the neural network works in synergy with the others in order to obtain the maximum efficiency of the entire network even if it may not correspond to the maximum efficiency of the single node, that is the single PV module.

Still advantageously the apparatus comprises at least one managing unit apt to manage the electronic units of a string, said managing unit comprising at least one microprocessor and communication means for communicating with each electronic unit of that string. In this case the microprocessor of the managing unit comprises the algorithm applying the neural networks model and it is the main node of the neural network while the microprocessors of the electronic units managed by that managing unit are further nodes of the neural network.

When the system comprises a managing unit the microprocessor of each electronic unit may be devoted to keep the power produced by the associated PV module at its maximum but its behaviour is also affected by the managing units which gathers and processes data (mainly incoming and outgoing values of voltage and current) from all the electronic units and it may affect the electronic unit which deviates from PV module MPPT behaviour if it is required in order to have the maximum power production in the entire string and in the entire PV power generation system.

In a preferred embodiment the electronic units also comprise batteries, battery charging/power managing means and working and/or connection status signalling means.

Still in a preferred embodiment the managing units also comprise memory means for data gathering and logging, a supervision engine apt to control the status and the activity of the managing unit and communication interfacing means able to interface the managing unit with data networks using various communication protocols for connecting the managing unit with various external devices such as acoustic and/or light signalling means, external PCs, GSM devices, display means, external memory means, PLC devices, solar tracking devices for tilting the angle of the PV modules and many other devices.

The method and the apparatus of the invention are able to minimize the loss of energy in PV power generation systems due to many external factors such as PV modules' dirtiness or characteristic tolerances, rain, clouds, shadows, cable differences in length, no perfect alignment of every solar cell, heat, wind, humidity and many other internal or external factors.

In addiction the apparatus perform a PV module by PV module control that permits to detect unmatched modules and failures and a thieves' alarm can be simply integrated using voltage measurements and continuity tests on PV modules, and signalled by the managing units of the apparatus

BRIEF DESCRIPTION OF THE DRAWINGS

These and other characteristics of the invention will be clear from the following description of preferred forms of embodiment, given as a non-restrictive example, with reference to the attached drawings wherein:

FIG. 1 shows a schematic representation of a simple PV power generation system comprising the apparatus of the invention;

FIG. 2 shows a portion of the PV power generation system of FIG. 1;

DETAILED DESCRIPTION OF PREFERRED EMBODIMENTS

With reference to FIG. 1 it is pointed as a whole with 10 a PV power generation system comprising a single string, 11, of PV modules, 12a to 12p, each comprising an array of PV cells.

Each PV module is wired to an electronic unit, 20a to 20h, which are half the PV modules because two PV modules are connected to each electronic unit. The electronic units, 20a to 20h, are wired in series, just like PV modules in standard PV power generation systems, and connected to an inverter, 40, that could be a mains grid-tie inverter. Through communication means, 50, for instance a data transmission bus, each electronic unit communicates with a managing unit, 60, comprised in a managing center, 70.

The managing center 70 also comprises Wi-Fi transmission means, 71, and bridge means, 72, for transmitting data from the managing unit 60 to external devices, acoustic signalling means, 73, and relay means, 74, thereto for emitting alarm signals, and a battery and charge controller unit, 75, apt to power supplying the manager center 70, also thanks to an auxiliary PV module, 76.

In FIG. 2 you can see more in detail a portion of the PV power generation system of FIG. 1 where are represented four PV modules connected in couples to two electronic units. The electronic units are then wired in series.

Figure 3:
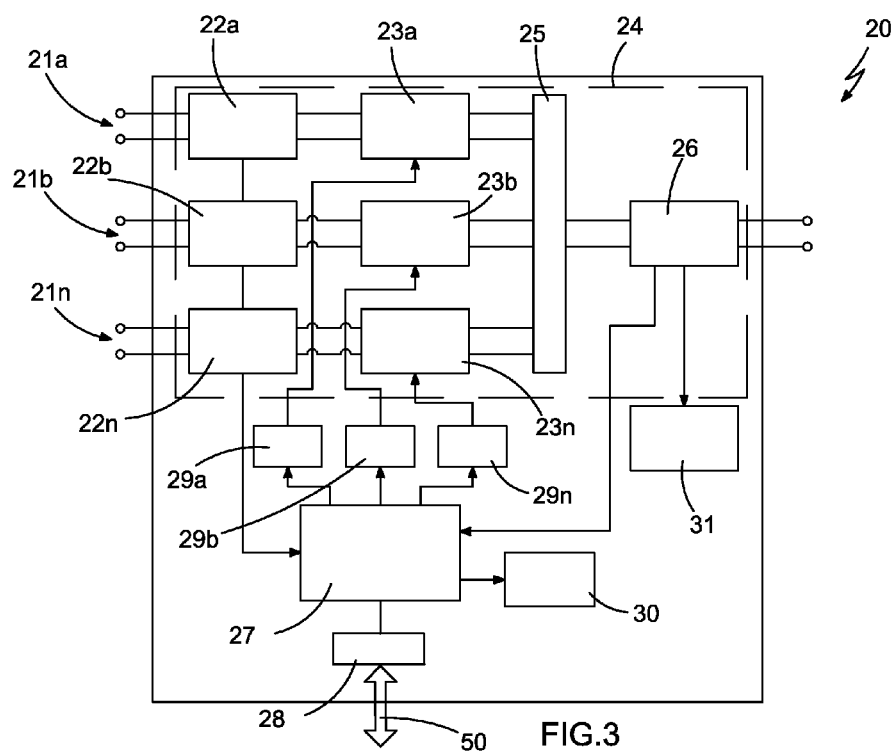
FIG. 3 shows a functional block diagram of an electronic unit according to the invention.

As shown in FIG. 3 an electronic unit, 20, comprises, according to a specific embodiment of the invention: at least two input connection means, 21a, 21b, for connecting at the output of two PV modules; at least two voltage and current measuring means, 22a, 22b, for measuring the voltage and current at the output of the PV modules; at least two power stages, 23a, 23b, of a DC to DC converter/power supply unit, 24; a DC power bus, 25, apt to connect in parallel the outputs of the power stages; further voltage and current measuring means, 26, for measuring the voltage and current at the output of the electronic unit; a microprocessor, 27, receiving data from the voltage and current measuring means 22a, 22b and 26 and able to communicate, by suitable communication interfacing means, 28, and the communication means 50, with the managing unit 60; driving means, 29a, 29b, controlled by the microprocessor and apt to operate the power stages 23a and 23b; alarm means, 30, controlled by the microprocessor; and battery charging/power managing means, 31.

The electronic units 20 may also be designed to be connected to a single PV module and in this case it do not need the DC power bus, or it may be connected to a greater number of PV modules, providing in this case further input connection means, 21n, more voltage and current measuring means, 22n, further power stages, 23n and driving means, 29n, thereof.

In a preferred embodiment the DC to DC converter/power supply unit 24 is a boost derived switch mode power converter and the electronic units 20 also comprise batteries, status and connection leds and further digital and analogue I/O connectors.

Figure 7:
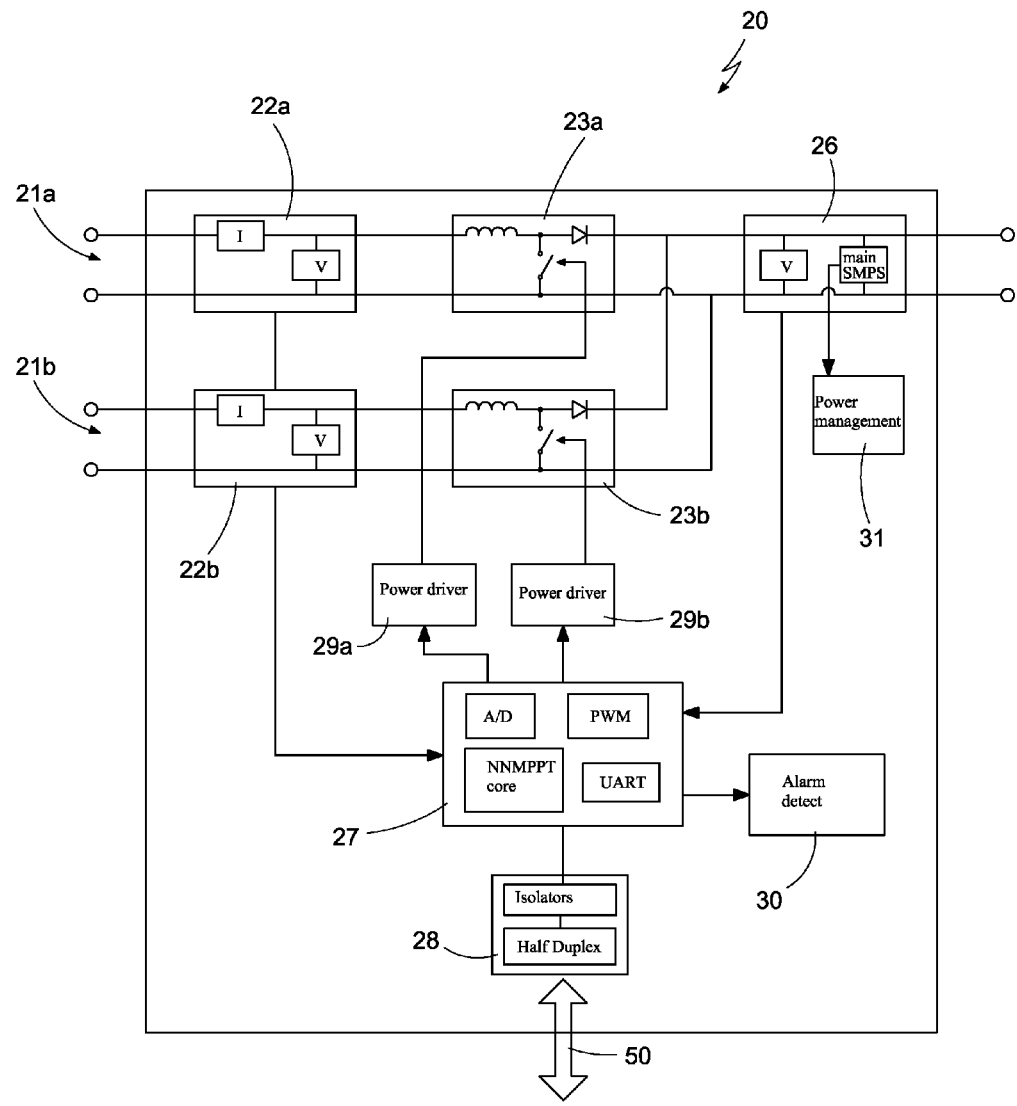
FIG. 7 shows a more detailed functional block diagram of the electronic unit according to the block diagram of FIG. 3.

A preferred embodiment of an electronic unit 20 according to FIG. 3 is shown in FIG. 7. In this case the electronic unit 20 is connected to two PV modules through the input connection means 21a and 21b. The voltage and current measuring means 22 contains a current sense and a voltage sense whereas the further voltage and current measuring means 26 contains a voltage sense and a main SMPS (switch mode power supply) connected to the battery charging/power managing means 31, while current sense is not needed as the output current is imposed in the power stages 23. Each power stage 23 comprises an inductance in series with a diode and a switch in parallel (i.e. a MOSFET) operated by the respective power driver 29. The microprocessor 27 comprises an A/D converter for converting analogue data from the voltage and current measuring means 22 and 26, a PWM module for commanding the power drivers 29, a UART module for managing serial connections, and a processing core running a neural network MPPT. The communication interfacing means 28 comprises isolators and a half-duplex interface for communicating with other electronic units via a RS 485 serial connection 50.

The managing unit 60 mainly comprises a microprocessor, 61, where a neural network based model algorithm runs, and communication interfacing means, 62, for communicating with each electronic unit, 20a to 20h, of the string, through the communication means 50.

Figure 4:
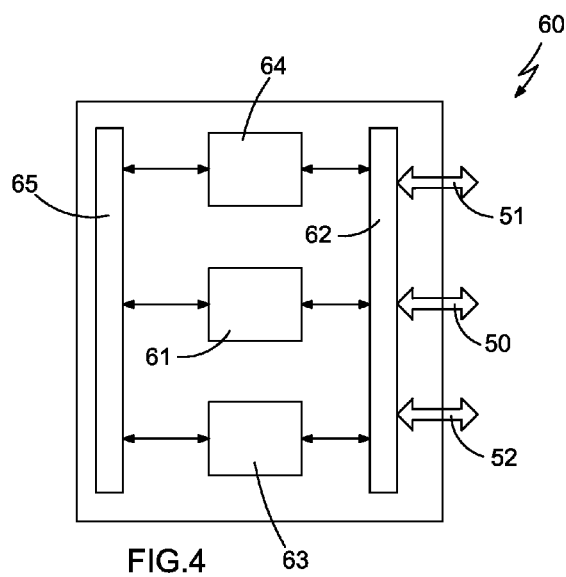
FIG. 4 shows a functional block diagram of a managing unit according to the invention.

In a preferred embodiment, shown in FIG. 4, the managing unit 60 also comprises memory means, 63, for data gathering and logging, a supervision engine, 64, apt to control the status and the activity of the managing unit and an internal bus, 65, for internal communication of the previous units.

The communication interfacing means 62 are able to interface the managing unit with data networks, 51, using various communication protocols and they also provide general purpose digital outputs, 52.

Thanks to the ability of interfacing data networks, 51, and to the digital outputs, 52, the managing unit 60 can be connected to external devices such as acoustic and/or light signalling means, 73, external PCs, GSM devices, display means, external memory means, PLC devices, solar tracking devices for tilting the angle of the PV modules and many other devices.

Figure 5:
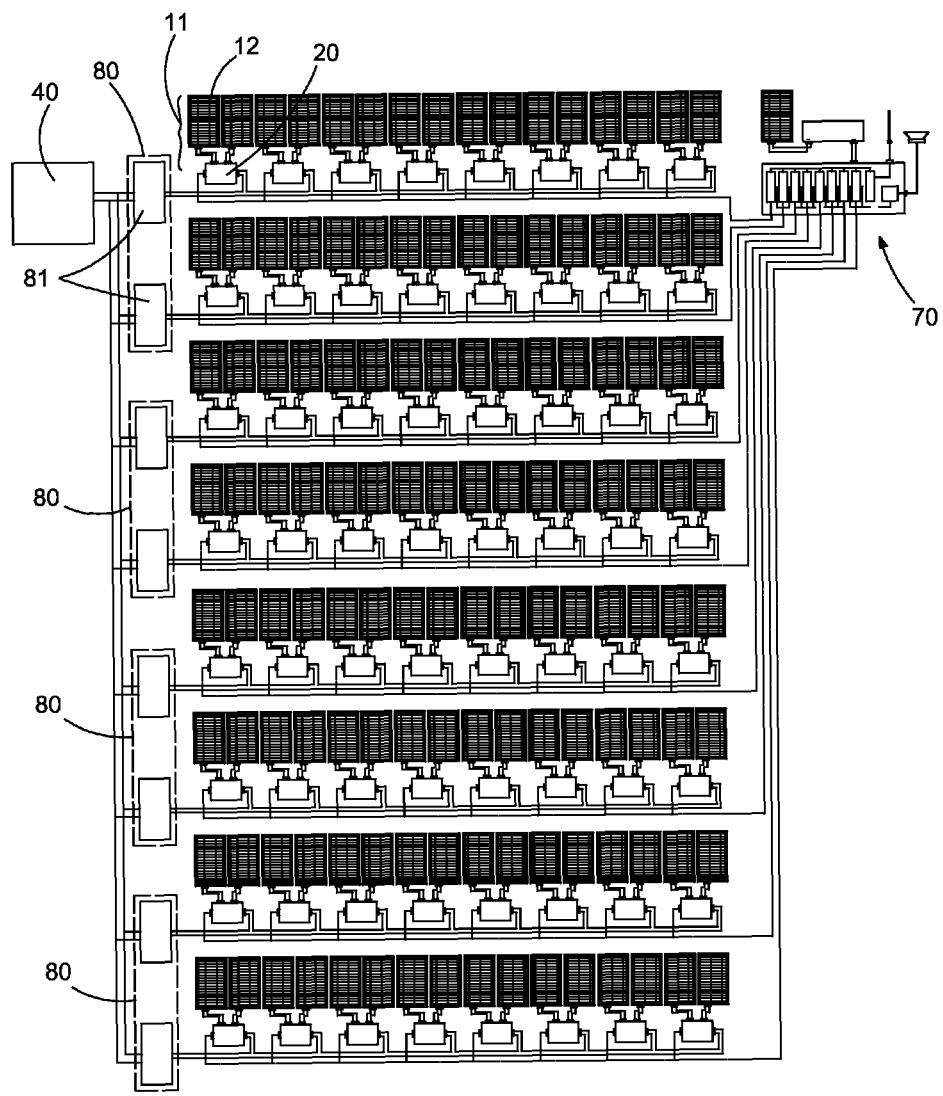
FIG. 5 shows a schematic representation of a more complex PV power generation system having an array of PV modules and comprising the apparatus of the invention.

In FIG. 5 is shown the apparatus of the invention integrated in a multi-string PV power generation system.

There are eight identical strings, 11, of PV modules connected to electronic units wired in series, just like in FIG. 1.

The strings are connected in couples to dual-channel string converters, 80, each provided with two MPPT devices, one per string, apt to balance and optimize the power generated by the string thereof according to known techniques.

The outputs of the string converters 80 are put in parallel and led to the inverter, 40.

In this PV system configuration the managing center, 70, contains as many managing units, 60, as the number of strings 11. Each managing unit communicates with and manages the electronic units 20 of a string.

The method of the invention and the working principles of an apparatus according to the invention are described in the following.

PV modules are DC current generators (with an intrinsic diode in parallel) but, due to the shape of their characteristic curves, and to the presence of many factors (dirtiness, rain, clouds, shadows, modules' characteristic tolerances, no perfect alignment of every cell, heat, wind humidity, rapidly changing shadings, and so on) that effect their efficiency, in order to obtain the maximum power from the entire PV power generation system, the power they generate needs to be properly conditioned by the DC to DC converters/power supply units, 24. In fact, according to a specific embodiment of the method of the invention, in an electronic unit 20 the measuring means 22a and 22b perform a measuring phase of the voltage and current values at the output of two PV modules, than they are properly subjected to a DC to DC conversion/power supply phase by the power stages 23a and 23b and, after coupling them, the voltage and current values at the output of the electronic unit are measured by further measuring means 26 to obtain feedback values.

The DC to DC conversion/power supply phase is controlled by the microprocessor 27 that receives data from the measuring means 22a, 22b and 26 and, together with the microprocessor 61 of the managing unit 60, processes them and the voltage and current data of the other electronic units of the string and then send proper signals to the driving means 29a and 29b that operate the power stages 23a and 23b.

So, in the disclosed embodiment, the electronic unit 20 is a dual-channel boost derived switch mode power converter, microprocessor controlled, that couples the current flowing from the two input PV modules, measuring input and output values, and passing them to microprocessors that control the power stages driving means.

To obtain the best possible power conditioning by each single switch mode power converters 24, the microprocessor 61 of the managing unit 60 collects data (mainly voltage and current values but maybe also temperatures and other working parameters) from the microprocessors 27 of the electronic units 20a to 20h, and runs a neural network based algorithm in which the microprocessors 61 and 27 contain the nodes of said neural network. Then the microprocessor 61 send back to the various microprocessors 27 the elaborated new working parameters of the power stages.

For example, in case a PV module has a 20% irradiance drop (little shading, little dirtiness or the like) the behaviour of the entire string is modified and the current in the string should be limited at its maximum value allowed by the PV module subject to irradiance drop. The other PV modules should have a voltage rise due to the current limiting and energy produced by the string would be reduced of a certain percentage. In such a case the managing unit demands to electronic units associated to PV modules having higher irradiance to bring a higher current, so that energy loss is avoided or strongly reduced.

In a preferred embodiment a proprietary multilayer perceptron neural network MPPT is implemented which substantially consists of a distributed analogue intelligence comprising input nodes, intermediate hidden nodes and output nodes. Each input node processes an input parameter (for each electronic unit 20 input parameters are input current, input voltage, output current, output, voltage, temperature, etc) and produces an output which affects each intermediate hidden node according to a respective time dependent weight. Then, each intermediate hidden node processes its inputs and produces an output which affects each output node according to a respective time dependent weight. In their turn, outputs nodes produce an output which affects the various PWM.

In addiction, according to a preferred embodiment the implemented proprietary NNMPTT (neural network MPPT) algorithm bases its decisions on three main sub algorithms: voltage track, current track and auto track.

The auto track behaviour is the most common algorithm running on power optimizers: it is a fast maximum power point tracking that looks for the maximum power point voltage/current coordinates and locks around it. It can be demonstrated that this is the best power harvesting technique when there are large differences between panels (ex. shading), so a string rebalancing is not sufficient to recover every watt of potentially wasted power.

The Current Track behaviour is a string rebalancing technique: when mismatches between panels are not serious enough to need the panel-by-panel MPPT, the managing unit asks power units to follow a calculated current point in order to minimize power switching noise that can lead the Inverter MPPT to a non-ideal working point (i.e. cloudy sky, panel's dirtiness, etc.)

The Voltage Track behaviour is a string voltage boost technique: in plants with more than three strings per MPP Inverter Input, the voltage of a string may be too low to make the inverter start in the morning, or stop in the evening. In small plants, where inverters have a very large MPP voltage range, this technique is never used, and may be disabled. But in bigger plants, where the MPP voltage range is very shorter than small ones (conversion efficiency problems, correlated to dissipation problems) this technique is very useful to recover sunrise and sunset energy: big plants means big power, even with low irradiation.

The implemented proprietary NNMPTT algorithm is able to switch from one to another of the above behaviours in order to optimize the entire system behaviour.

Having two PV modules connected per electronic unit permits to deal with very big current limit drops. In fact, as it is very difficult that two adjacent modules would have very serious problems, they will help together to maintain the string current to an acceptable value. Further advantage of having two PV modules connected per electronic unit is that the number of PV modules per string is doubled.

The apparatus and the method of the invention bring further undoubted advantages: the electronic units perform a module by module control that permits to detect unmatched modules and failures and a thieves' alarm is simply integrated using voltage measurements and continuity tests on PV modules. In addiction, the specific layout of the power stages 24 shown in FIG. 7 allows the manager to short-circuit a single PV module to avoid high string currents and voltages, for instance when extinguishing a fire is required.

Obviously different embodiments of the above disclosed method and apparatus may be provided without exiting from the present invention.

In fact, the various components comprised in the electronic units 20 or in the managing units 60 could be replaced by components having a similar function or able to carry out, as a whole, the procedures carried out by said units.

For various reasons it could be that not every PV modules of a string or not every strings of the PV system are subjected to the method of the invention or connected to the electronic units.

The topology of the electronic units and the managing units could be very different from the one disclosed. In fact, according to a variant the microprocessor 61 of the managing unit could be comprised in one electronic unit of the string, maybe the closest to the inverter or string converter.

In another variant the microprocessor 61 could lack and the neural network algorithm, or another algorithm having similar function, could directly runs in the microprocessors 27 of the electronic units. In this case the microprocessors 27 of the various electronic units communicate each other the acquired parameters through the communication means 50 and still through the communication means 50 they send back each other working parameters so that the DC to DC conversion process performed in one electronic unit is affected by the parameters and results of conversion processes taking place in other electronic units.

Figure 6:
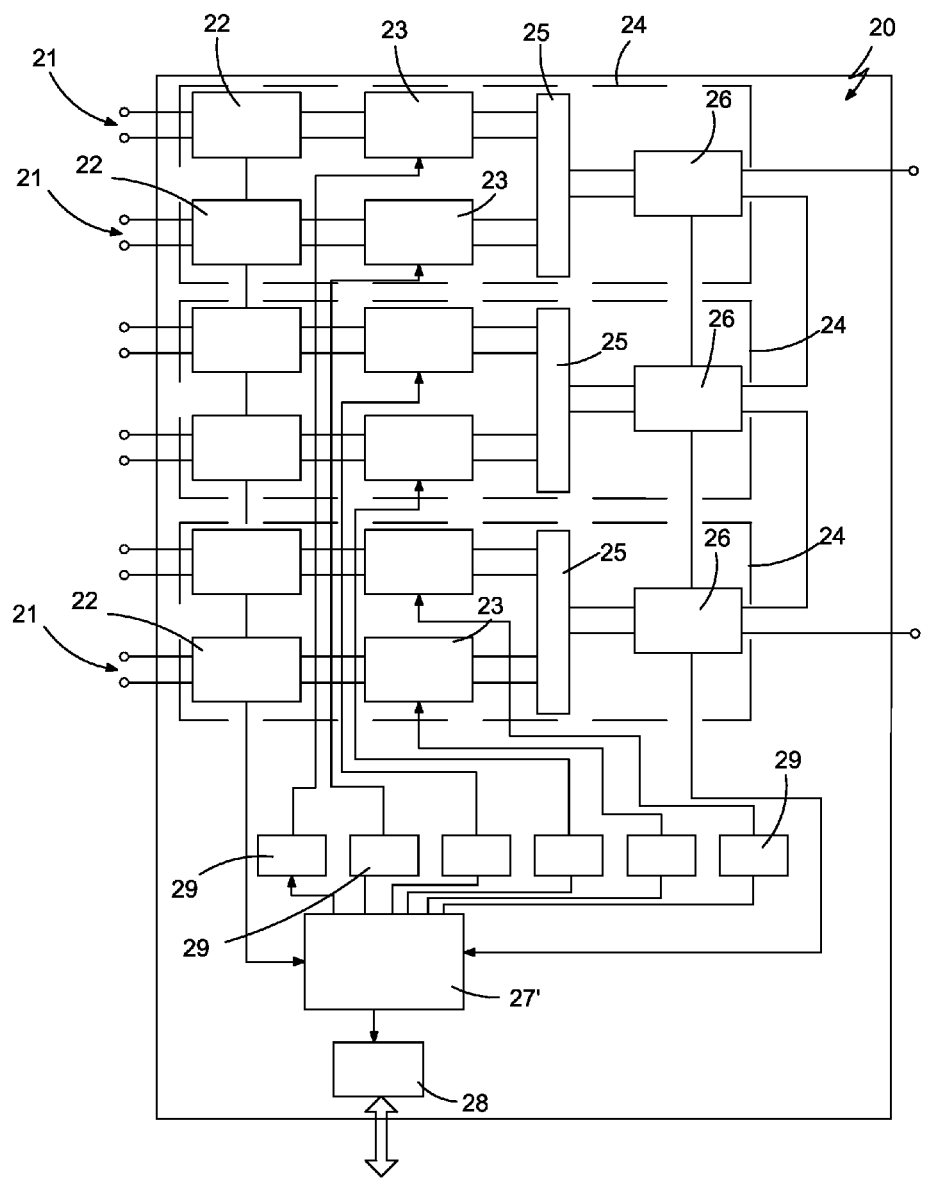
FIG. 6 shows a functional block diagram of a different embodiment of an electronic unit according to the invention.

In a further variant a single electronic unit could be provided comprising as many power stages as the number of PV modules connected. In the single electronic unit per string could be comprised many microprocessor 27 and one microprocessor 61 or even a single microprocessor could run a definite number of algorithms realizing a virtual neural network within the same microprocessor. In this last case, shown in FIG. 6, each power stage 23 has its own upstream voltage and current measuring means 22 and its own downstream voltage and current measuring means 26. A voltage and current measuring means 26 could also be associated to two power stages 23 whose output is put in parallel by a DC power bus 25. All current and voltage data are collected and processed by a single microprocessor, 27', which drives each power stage 23 by a respective drive means 29. The output of the various power stages 23, after passing its voltage and current measuring means 26 is then connected in series.

Finally, in the above disclosure, the method of the invention is applied to optimize the efficiency of PV modules in PV power generation systems, but it could be advantageously applied to different kinds of DC power generators connected in series. For instance the method could optimize the efficiency of electric accumulators or fuel cells connected in series in UPS systems, hybrid or electric vehicles or other systems providing series of DC power generators.

These and other variants or modifications may be carried out to the method and apparatus for managing and conditions PV power generation systems according to the invention, still remaining within the ambit of protection as defined by the following claims.

The invention claimed is:

1. An apparatus for managing and conditioning PV power generation systems in which photovoltaic (PV) modules are wired in series to form at least one string of PV modules and in which, in case the system comprises several strings, the strings are connected in parallel to a DC power bus connected to at least one inverter operable to convert DC current to AC current, wherein in a string of PV modules a first PV module is wired to a first electronic unit and a second PV module is wired to a second electronic unit, wherein the first and second electronic units are wired in series and connected to the inverter, each electronic unit, comprising:
 a DC to DC converter acting upon the voltage or current at the output of the respective PV module;
 a measuring system for measuring the voltage or current at the output of the respective PV module;
 a second measuring system for measuring the voltage or current at the output of the DC to DC converter;
 a driving system for operating the DC to DC converter; and
 at least one microprocessor operable to control the driving system of the DC to DC converter for running a maximum power point tracking (MPPT) algorithm depending on the voltage or current at the output of the first and second PV modules and on the voltage or current at the output of the DC to DC converters of the first and second electronic units;
 wherein one string of PV modules of the PV power generation system comprises:
  a first electronic unit connected to a first and a third PV modules of the string;
  a second electronic unit connected to a second and a fourth PV modules of the string;
  wherein the first and second electronic units are wired in series;
  wherein the first electronic unit comprises:
   a measuring system for measuring the voltage or current at the output of the first PV module;
   a measuring system for measuring the voltage or current at the output of the third PV module;
   a first power stage of the DC to DC converter operable to convert the output of the first PV module;
   a second power stage of the DC to DC converter operable to convert the output of the third PV module;
   a DC power bus for connecting in parallel the output of the first and second power stages;
   a second measuring system for measuring the voltage or current at the output of the DC to DC converter;
   a driving system for operating the first and second power stages, at least one microprocessor operable to control the driving system;
  wherein the second electronic unit comprises:
   a measuring system for measuring the voltage or current at the output of the second PV module;
   a measuring system for measuring the voltage or current at the output of the fourth PV module;
   a first power stage of the DC to DC converter operable to convert the output of the second PV module;
   a second power stage of the DC to DC converter operable to convert the output of the fourth PV module;
   a DC power bus for connecting in parallel the output of the first and second power stages;
   a second measuring system for measuring the voltage or current at the output of the DC to DC converter;
   a driving system for operating the first and second power stages, at least one microprocessor operable to control the driving system;
  wherein the at least one microprocessor of the first electronic unit comprises a communication system for communicating with at least one more microprocessor comprised in the second electronic unit.

2. The apparatus according to claim 1, wherein the microprocessors control the power stages according to an algorithm operable to optimize the voltage and DC current values at the input of the inverter.

3. The apparatus according to claim 2, wherein the algorithm applies a mathematical or computational model based on neural networks.

4. The apparatus according to claim 1, further comprising at least one managing unit operable to manage the electronic units of a string, the managing unit comprising at least one microprocessor and a communication system for communicating with each electronic unit of that string in order to send back to the microprocessors new working parameters of the power stages of the DC to DC converters.

5. The apparatus according to claim 4, wherein the at least one microprocessor of the managing unit comprises the algorithm applying the neural networks model and it is the main node of the neural network while the microprocessors of the electronic units managed by that managing unit are further nodes of the neural network.

6. The apparatus according to claim 1, wherein the electronic units also comprise batteries, a battery charging/power managing system and working or a connection status signaling system.

7. The apparatus according to claim 4, characterized in that the managing units also comprise a memory system, at least one supervision engine operable to control the status and the activity of the managing unit and a communication interfacing system able to interface the managing unit with data networks using various communication protocols for connecting the managing unit with an external device including any one of an acoustic or light signaling system, external PCs, GSM devices, a display system, an external memory system, PLC devices, solar tracking devices for tilting the angle of the PV modules and many other devices.

* * * * *